United States Patent
Sugimoto et al.

(10) Patent No.: US 9,004,991 B2
(45) Date of Patent: Apr. 14, 2015

(54) TEMPERATURE CONTROL APPARATUS OF WORKING MACHINE

(75) Inventors: Yoshiaki Sugimoto, Nara (JP); Takashi Hoshi, Nara (JP); Kiyoshi Yoshioka, Nara (JP); Soichiro Yamada, Nara (JP)

(73) Assignee: DMG Mori Seiki Co., Ltd., Yamatokoriyama-shi (JP)

( * ) Notice: Subject to any disclaimer, the term of this patent is extended or adjusted under 35 U.S.C. 154(b) by 795 days.

(21) Appl. No.: 12/821,615

(22) Filed: Jun. 23, 2010

(65) Prior Publication Data

US 2010/0319903 A1 Dec. 23, 2010

(30) Foreign Application Priority Data

Jun. 23, 2009 (JP) .................................. 2009-148863

(51) Int. Cl.
| | |
|---|---|
| *G05D 23/00* | (2006.01) |
| *B23Q 11/14* | (2006.01) |
| *G05D 23/19* | (2006.01) |
| *G05D 23/20* | (2006.01) |

(52) U.S. Cl.
CPC .......... *B23Q 11/148* (2013.01); *G05D 23/1931* (2013.01); *G05D 23/2039* (2013.01)

(58) Field of Classification Search
CPC .......................... B23Q 11/148; G05D 23/1931
USPC ....................... 454/49–67, 69–125; 236/49.3; 700/299–300; 74/613–615
See application file for complete search history.

(56) References Cited

U.S. PATENT DOCUMENTS

| | | | | | |
|---|---|---|---|---|---|
| 4,549,472 | A | * | 10/1985 | Endo et al. ..................... | 454/187 |
| 4,557,184 | A | * | 12/1985 | Orii et al. ........................ | 454/60 |
| 4,723,480 | A | * | 2/1988 | Yagi et al. ....................... | 454/57 |
| 4,787,297 | A | * | 11/1988 | Johnson ......................... | 454/187 |
| 4,863,320 | A | * | 9/1989 | Rutschle et al. ................. | 409/134 |
| 5,025,638 | A | * | 6/1991 | Yamagishi et al. ............. | 62/180 |
| 5,902,183 | A | * | 5/1999 | D'Souza ........................ | 454/258 |
| 5,987,905 | A | * | 11/1999 | Nonoyama et al. ............ | 62/133 |
| 6,341,064 | B1 | * | 1/2002 | Bradley ......................... | 361/695 |
| 6,414,843 | B1 | * | 7/2002 | Takeda ....................... | 361/679.48 |
| 6,491,094 | B2 | * | 12/2002 | Rayburn et al. ............... | 165/250 |
| 6,674,040 | B2 | * | 1/2004 | Wehrli ......................... | 219/69.11 |
| 6,749,125 | B1 | * | 6/2004 | Carson et al. ................ | 236/49.3 |
| 7,258,280 | B2 | * | 8/2007 | Wolfson ........................ | 236/49.3 |
| 7,431,776 | B2 | * | 10/2008 | Creel et al. .................... | 148/194 |
| 7,890,195 | B2 | * | 2/2011 | Bergman et al. ................ | 700/17 |
| 8,123,142 | B2 | * | 2/2012 | Cislo ............................ | 236/49.3 |
| 8,186,174 | B2 | * | 5/2012 | Gilliland et al. ............. | 62/259.2 |
| 8,233,270 | B2 | * | 7/2012 | Pierson et al. ............ | 361/679.02 |
| 2005/0262910 | A1 | * | 12/2005 | De Vries ........................ | 70/491 |
| 2006/0177289 | A1 | * | 8/2006 | Bonora et al. ................ | 414/217 |
| 2009/0013703 | A1 | * | 1/2009 | Werner .......................... | 62/180 |

(Continued)

FOREIGN PATENT DOCUMENTS

| | | | | | |
|---|---|---|---|---|---|
| JP | | 11-287499 | * | 10/1999 | ............. F24F 11/02 |
| JP | | 2003-291050 A | | 10/2003 | |

(Continued)

*Primary Examiner* — Steven B. McAllister
*Assistant Examiner* — Ko-Wei Lin
(74) *Attorney, Agent, or Firm* — Westeman, Hattori, Daniels & Adrian, LLP

(57) ABSTRACT

Provided is a temperature control apparatus of a working machine that is inexpensive, energy-saving and capable of eliminating the temperature difference between a temperature in a room in which the working machine is installed and a temperature of a working area.

9 Claims, 4 Drawing Sheets

(56) References Cited

U.S. PATENT DOCUMENTS

| | | | |
|---|---|---|---|
| 2009/0014548 A1* | 1/2009 | Criss et al. | 236/44 C |
| 2009/0113923 A1* | 5/2009 | Young | 62/441 |
| 2009/0124189 A1* | 5/2009 | Barber | 454/258 |
| 2009/0178751 A1* | 7/2009 | Presley et al. | 156/60 |
| 2010/0112925 A1* | 5/2010 | Schmitt et al. | 454/184 |
| 2010/0291858 A1* | 11/2010 | Toy | 454/258 |
| 2010/0323600 A1* | 12/2010 | Tanaka | 454/66 |
| 2012/0100794 A1* | 4/2012 | Redshaw | 454/184 |

FOREIGN PATENT DOCUMENTS

| | | | | |
|---|---|---|---|---|
| JP | 2006-102939 A | 4/2006 | | |
| WO | WO 2009100052 A1 * | 8/2009 | | F24F 11/00 |

\* cited by examiner

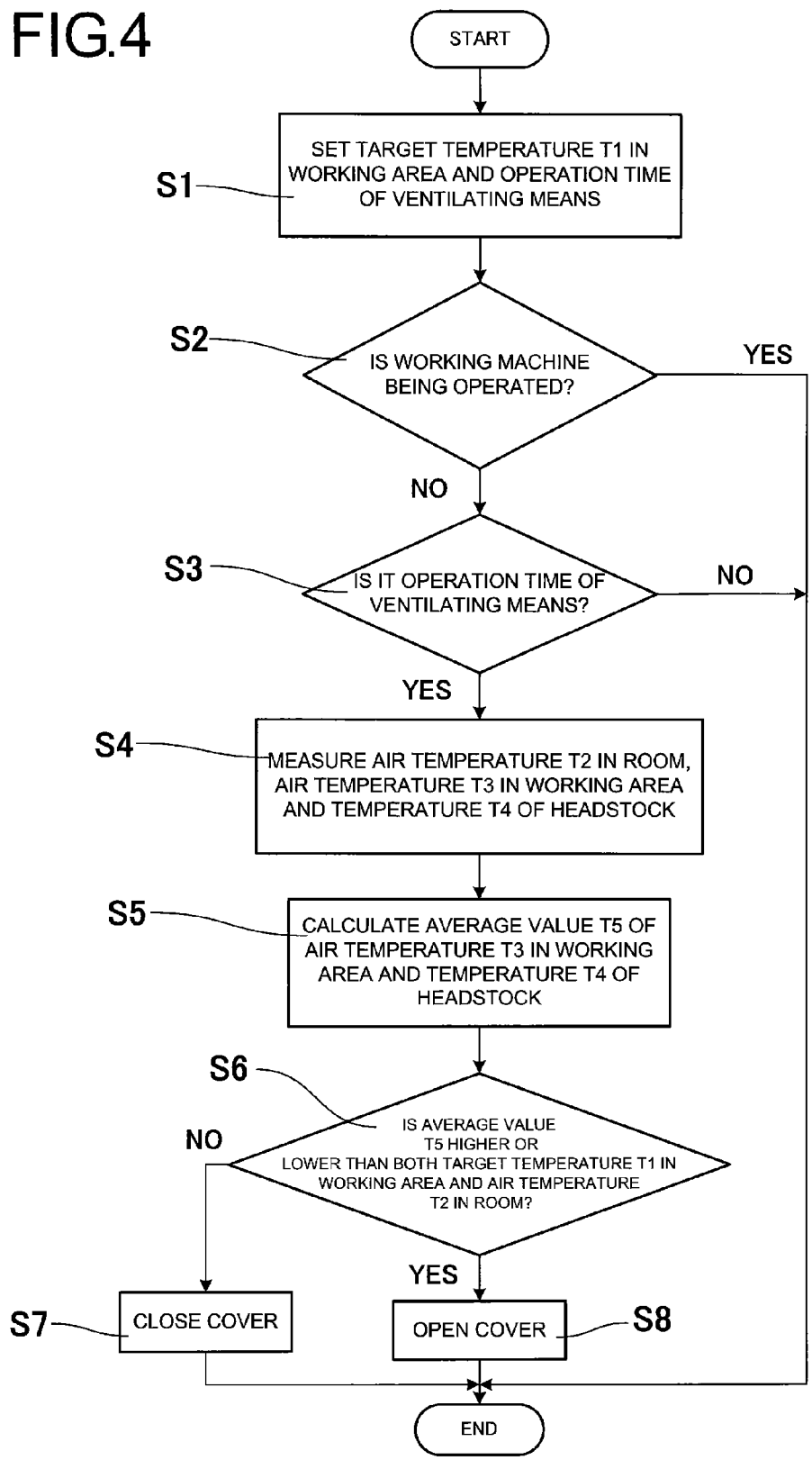

TEMPERATURE CONTROL APPARATUS OF WORKING MACHINE

FIELD OF THE INVENTION

The present invention relates to a temperature control apparatus of a working machine and in particular relates to a temperature control apparatus of a machine tool such as a numerically controlled lathe or a machining center.

BACKGROUND OF THE INVENTION

With a machine tool such as a numerically controlled lathe or a machining center, a spindle is rotated to move a tool rest, a spindle head and the like in order to perform cutting work on a work piece. Thus, the temperature of the respective components of the machine tool will rise due to the heat generation in the motor or rotating portion and the heat generation caused by the contact of the tool and the work piece.

Even in the following morning after the operation of the machine tool is ended, there are cases where the heat generated in the previous day remains in the respective components of the machine tool. Consequently, thermal displacement caused by the temperature difference between the temperature in the room in which the machine tool is installed and the temperature in the working area will occur in the respective components of the machine tool, which is undesirable in terms of working accuracy.

With the working machines disclosed in Japanese Patent Application Laid-open No. 2003-291050: Patent Document 1 and Japanese Patent Application Laid-open No. 2006-102939: Patent Document 2, the temperature in the working area is controlled to be a predetermined temperature and the working accuracy is prevented from being lowered due to thermal displacement by covering the entire working machine with a cover and supplying cool air, the temperature of which is controlled with an air conditioning unit using a cooling medium such as fluorocarbon (CFC), inside of the cover.

Nevertheless, since the working machines disclosed in Patent Document 1 and Patent Document 2 require an air conditioning unit, they are expensive and much energy must be spent in order to control the temperature in the working area to be a predetermined temperature.

SUMMARY OF THE INVENTION

An object of the present invention is to provide a temperature control apparatus of a working machine that is inexpensive, energy-saving and capable of eliminating the temperature difference between a temperature in a room in which the working machine is installed and a temperature in a working area.

The foregoing object is achieved with the following means. Specifically, the temperature control apparatus of a working machine according to the first aspect of the present invention includes ventilating means for replacing internal air in the working area with external air surrounding the working machine between the working area inside the working machine and the exterior of the working machine, comprising: a working area temperature sensor that detects a temperature of the working area; an external air temperature sensor that detects an external temperature surrounding the working machine; a ventilating means drive unit that drives the ventilating means; and a ventilating means control unit that compares the temperature in the working area, which is detected with the processing area temperature sensor, the external temperature surrounding the working machine, which is detected with the external air temperature sensor, and a preset target temperature in the working area and, in accordance with a result of the comparison, outputs a signal for driving or stopping the ventilating means to the ventilating means drive unit when the working machine is not being operated.

The temperature control apparatus of a working machine according to the second aspect of the present invention is a temperature control apparatus of a working machine according to the first aspect of the present invention, wherein the ventilating means control unit outputs a signal for driving the ventilating means to the ventilating means drive unit when the temperature in the working area becomes higher than both the external temperature surrounding the working machine and the target temperature in the working area.

The temperature control apparatus of a working machine according to the third aspect of the present invention is a temperature control apparatus of a working machine according to the first aspect of the present invention, wherein the ventilating means control unit outputs a signal for driving the ventilating means to the ventilating means drive unit when the temperature in the working area becomes lower than both the external temperature surrounding the working machine and the target temperature in the working area.

The temperature control apparatus of a working machine according to the fourth aspect of the present invention is a temperature control apparatus of a working machine according to the first aspect of the present invention, wherein the ventilating means control unit outputs a signal for stopping the ventilating means to the ventilating means drive unit when the temperature in the working area becomes equal to the external temperature surrounding the working machine.

The temperature control apparatus of a working machine according to the fifth aspect of the present invention is a temperature control apparatus of a working machine according to the first aspect of the present invention, wherein the ventilating means control unit outputs a signal for stopping the ventilating means to the ventilating means drive unit when the temperature in the working area becomes a value between the external temperature surrounding the processing machine and the target temperature.

The temperature control apparatus of a working machine according to the sixth aspect of the present invention is a temperature control apparatus of a working machine according to the first aspect of the present invention, wherein the temperature in the working area that is detected with the working area temperature sensor is an air temperature in the working area.

The temperature control apparatus of a working machine according to the seventh aspect of the present invention is a temperature control apparatus of a working machine according to the first aspect of the invention, wherein the temperature in the working area that is detected with the working area temperature sensor is a main structure temperature of the working machine.

The temperature control apparatus of a working machine according to the eighth aspect of the present invention is a temperature control apparatus of a working machine according to the first aspect of the present invention, wherein the external temperature surrounding the working machine that is detected with the external air temperature sensor is an air temperature in the room in which the working machine is installed.

The temperature control apparatus of a working machine according to the ninth aspect of the present invention is a temperature control apparatus of a working machine according to the first aspect of the present invention, wherein air replacement performed by the ventilating means is performed by the opening and closing of a cover that covers at least a part of the working area.

The temperature control apparatus of a working machine according to the tenth aspect of the present invention is a temperature control apparatus of a working machine according to the first aspect of the present invention, wherein the ventilating means is a fan provided in the working machine.

The temperature control apparatus of a working machine according to the eleventh aspect of the present invention is a temperature control apparatus of a working machine according to the first aspect of the present invention, wherein the ventilating means control unit outputs the signal only during a specific time period of a day.

The temperature control apparatus of a working machine according to the present invention including ventilating means for replacing internal air in the working area with external air surrounding the working machine between a working area inside the working machine and an exterior of the working machine comprises a ventilating means control unit that compares the temperature in the working area, which is detected with the working area temperature sensor, the external temperature surrounding the working machine, which is detected with the external air temperature sensor, and a pre-set target temperature in the working area and, in accordance with a result of the comparison, outputs a signal for driving or stopping the ventilating means to the ventilating means drive unit when the working machine is not being operated. Thus, an air conditioning unit is no longer required and it is possible to provide an inexpensive and energy-saving temperature control apparatus of a working machine.

BRIEF DESCRIPTION OF THE DRAWINGS

FIG. 4 is a flowchart showing the operation of the temperature control apparatus of a working machine according to an embodiment of the present invention.

DETAILED DESCRIPTION OF PREFERRED EMBODIMENTS

Figure 1:
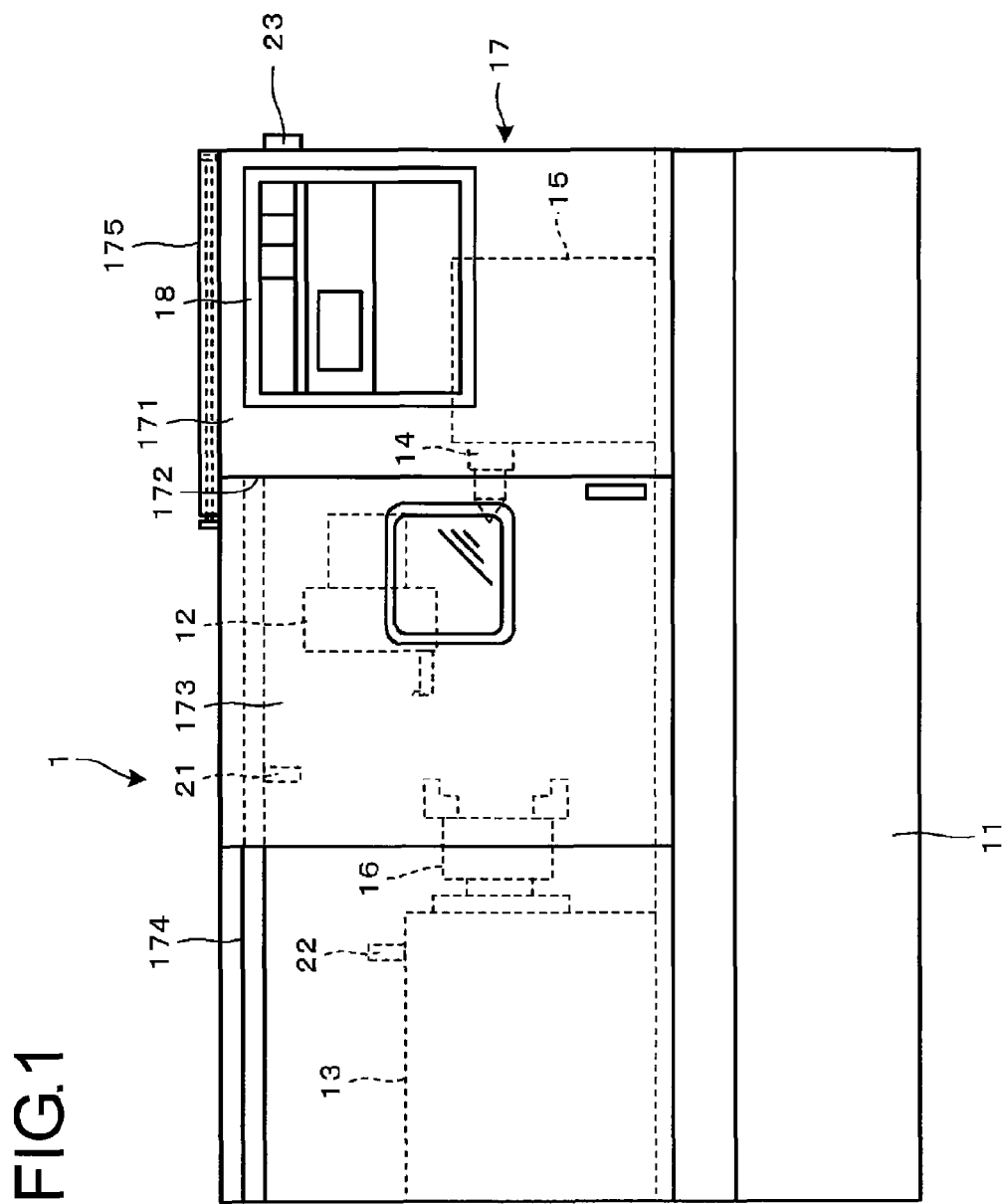
FIG. 1 is a front view showing a general composition of a numerically controlled lathe provided with the temperature control apparatus of a working machine according to an embodiment of the present invention and showing a state where the cover for covering the opening for working is closed.
Figure 2:
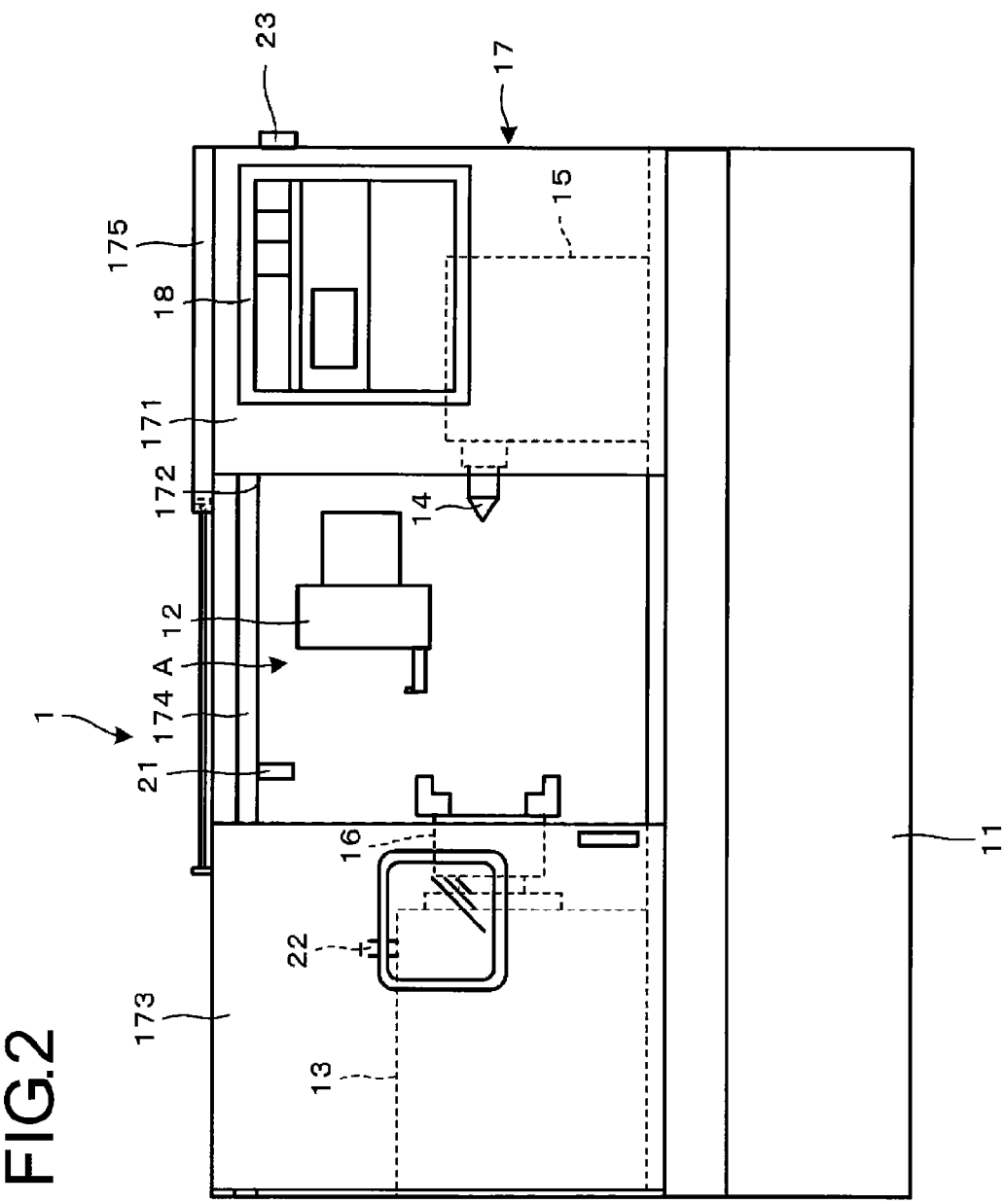
FIG. 2 is a front view of the numerically controlled lathe of FIG. 1 showing a state where the cover for covering the opening for working is open.

Embodiments of this invention will be explained with reference to the drawings below. FIG. 1 is a front view showing a general composition of a numerically controlled lathe provided with the temperature control apparatus of a working machine according to an embodiment of the present invention and showing a state where the cover for covering the opening for working is closed. FIG. 2 is a front view of the numerically controlled lathe of FIG. 1 showing a state where a cover for covering the opening for working is open.

A numerically controlled lathe 1 shown in FIG. 1 and FIG. 2 is composed of a tool rest 12 that is disposed movably in the X axis and Z axis directions on a bed 11, a headstock 13 that is fixed on the bed 11 and a tailstock 15 including a tailstock spindle 14 that is disposed movably in the Z axis direction on the bed 11.

A chuck 16 is mounted on the tip of a work piece spindle (not shown) of the headstock 13 and the work piece (not shown) is gripped by the chuck 16. The tool rest 12, the chuck 16 and the tailstock 15 configure a working area A (see FIG. 2) for performing machining on the work piece.

The tool rest 12, the headstock 13, the tailstock 15 and the like on the bed 11 are entirely covered with a body cover 17 for preventing chips and cutting oil from scattering to the outside. An operation panel 18 is mounted on the right side of a front body cover 171 constituent of the body cover 17. The operation panel 18 is used for setting the working program, inputting the various setting values of the temperature control apparatus according to the present invention and monitoring the state of working and the like.

An opening for working 172 is formed on the front body cover 171 at the center portion in its horizontal direction. The opening width of the opening for working 172 is set to be a size that encompasses the chuck 16 and the tailstock spindle 14; that is, a size that surrounds the working area of the center work piece and the opening height of the opening for working 172 is set to be a size that encompasses the lower edge and upper edge of the front body cover 171. The state of working of the work piece can be observed through the opening for working 172, which is also used for attaching and removing the work piece to and from the chuck 16, attaching and removing a tool to and from the tool rest 12 and performing other maintenance.

A cover (ventilating means) 173 for opening and closing the opening for working 172 is disposed on the front body cover 171. The cover 173 covers at least a part of the working area A and is supported so as to be slidable along a guide rail 174 that is disposed at the upper edge of the front body cover 171. A cylinder (ventilating means drive unit) 175 is mounted on the upper right edge of the front body cover 171 and the cylinder 175 causes the cover 173 to be driven reciprocally and to slide along the guide rail 174.

During the working of the work piece, the cover 173 is closed and the opening for working 172 is closed to prevent the chips and cutting oil from scattering to the outside, as shown in FIG. 1. As shown in FIG. 2, the cover 173 is opened and the opening for working 172 is opened when ventilation is performed between internal air in the working area A and external air, a work piece is attached to and removed from the chuck 16, a tool is attached to and removed from the tool rest 12 and other maintenance is performed.

As shown in FIG. 1 and FIG. 2, a temperature sensor 21 is provided in the working area A for detecting the air temperature in the working area A. A plurality of temperature sensors 21 may also be provided for detecting the air temperature of a plurality of locations in the working area A. In addition, a temperature sensor 22 for detecting the temperature of the headstock 13 of the numerically controlled lathe 1 is mounted on the headstock 13. The temperature sensor 22 is a temperature sensor for detecting the temperature of the main structure of the numerically controlled lathe 1. The temperature sensor 22 can be mounted not only on the headstock 13 but also be arbitrarily on one or more main structures such as the bed 11, the tool rest 12, the tailstock 15 or the like.

Moreover, a temperature sensor 23 for detecting the air temperature of the room, in which the numerically controlled lathe 1 is installed, is mounted on the right side face of the body cover 17. The temperature sensor 23 is an external air temperature sensor for detecting the external temperature surrounding the numerically controlled lathe 1. A plurality of temperature sensors 23 may also be mounted for detecting the air temperature at a plurality of external locations.

Figure 3:
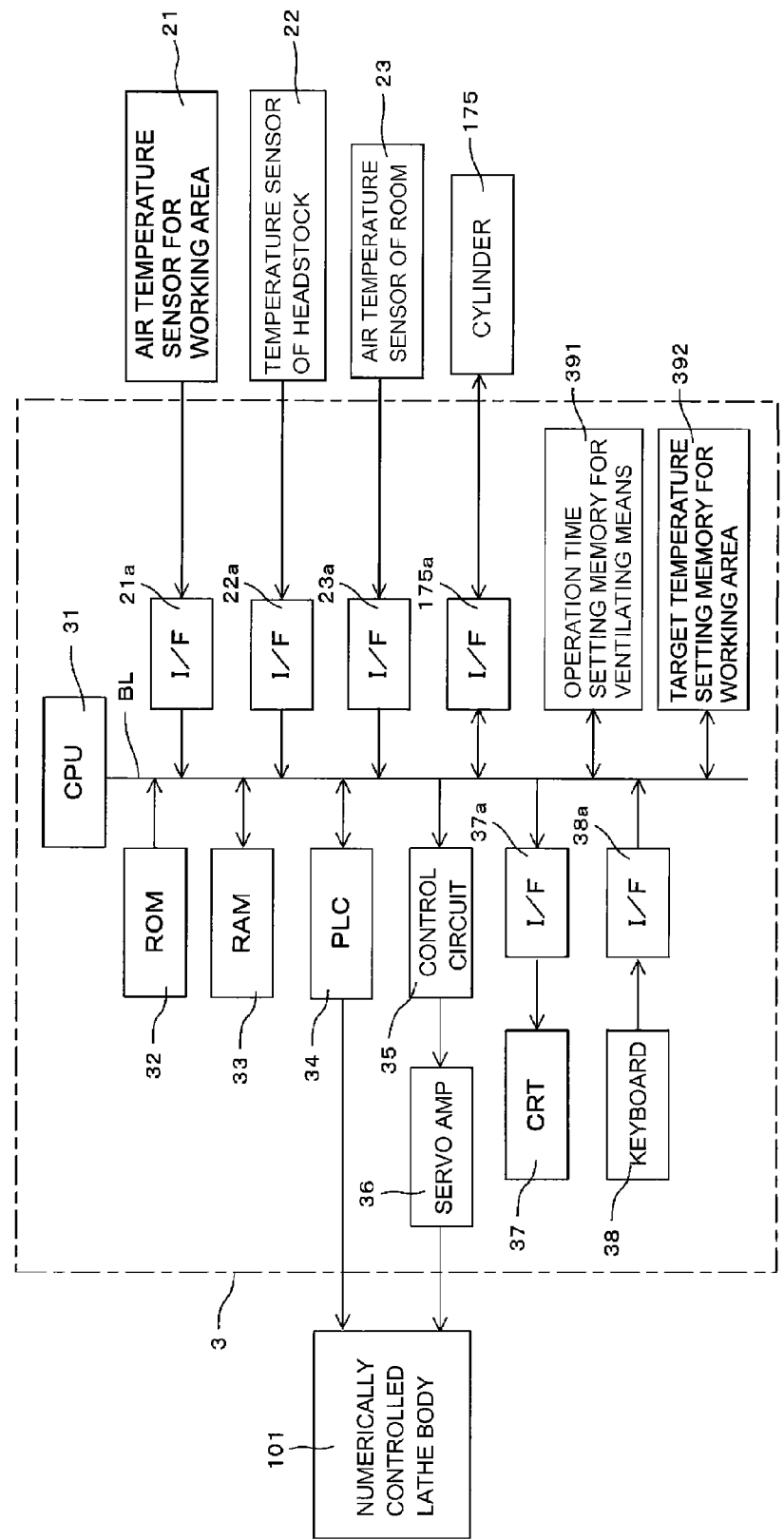
FIG. 3 is a block diagram showing a numerical control unit provided with the temperature control apparatus of a working machine according to an embodiment of the present invention.

The block diagram of FIG. 3 showing the numerical control unit provided with the temperature control apparatus of a working machine according to an embodiment of the present invention will now be explained. As shown in FIG. 3, the numerically controlled lathe 1 comprises a numerical control unit 3 for controlling the operation of the numerically controlled lathe body 101. The numerical control unit 3 includes a CPU 31 for governing the control of the overall numerical control unit 3, a ROM 32 for storing system programs and the like of the temperature control apparatus of a working machine and a RAM 33 for storing NC programs, various parameters and modal information such as tool correction values.

A PLC (Programmable Logic Controller) 34 controls the operation of the numerically controlled lathe body 101 by commands of the M function or T function for supplying or discontinuing the cutting fluid and indexing the tool of the tool rest 12 based on the NC programs and the like stored in the RAM 33.

Receiving a command from the CPU 31, the control circuit 35 controls the operation of a servo motor (not shown) by outputting an axis movement command or the like to a servo amp 36 that drives the servo motor mounted on the numerically controlled lathe body 101.

A CRT 37 mounted on the operation panel 18 (see FIG. 1 and FIG. 2) displays various types of information such as the position of the respective axes, alarm, parameters and NC programs on the screen according to a command from the CPU 31. The CRT 37 additionally displays an image for setting the operation time of the ventilating means and an image for setting the target temperature in the working area according to a command from the CPU 31. The keyboard 38 mounted on the operation panel 18 is used by the operator to input and edit the NC programs, set the operation time of the ventilating means, set the target temperature of the working area and so on. The CRT 37 and the keyboard 38 are connected to a bus line BL via interfaces 37a and 38a, respectively.

An operation time setting memory 391 of the ventilating means stores the operation time of the ventilating means that was input from the keyboard 38. The operation time of the ventilating means is preferable to be a specific time period for which the numerically controlled lathe 1 is not operated and which is before the start of business operation (for example, between 4 AM and 8 AM). Moreover, a target temperature setting memory 392 for the working area stores a target temperature T1 in the working area that was input from the keyboard 38.

The temperature sensor 21 for detecting the air temperature in the working area A, the temperature sensor 22 for detecting the temperature of the headstock 13, the temperature sensor 23 for detecting the air temperature in the room and the cylinder 175 for opening and closing the cover 173, which are aforementioned, are connected to the bus line BL via interfaces 21a, 22a, 23a and 175a, respectively.

FIG. 4 is a flowchart showing the operation of the temperature control apparatus of a working machine according to an embodiment of the present invention. As shown in FIG. 4, in step S1, the keyboard 38 is used for setting the target temperature T1 in the working area to be, for example, 20° C.±2° C. in the target temperature setting memory 392 for the working area. Moreover, the keyboard 38 is used for setting the operation time of the ventilating means to be, for example, between 4 AM and 8 AM in the operation time setting memory 391 for the ventilating means.

In step S2, whether the numerically controlled lathe (working machine) 1 is being operated is checked and the routine proceeds to step S3 if the result is NO. If the result is YES, the operation of the temperature control apparatus is ended since the cover 173 cannot be opened nor closed during the operation of the numerically controlled lathe 1 due to issues such as the operator's safety and the scattering of chips and the like.

In step S3, whether it is the operation time of the ventilating means (for example, between 4 AM and 8 AM) is checked and the routine proceeds to step S4 if the result is YES. If the result is NO, the operation of the temperature control apparatus is ended since it is not the time period for operating the ventilating means.

In step S4, the temperature sensor 23 for detecting the air temperature in the room is used to measure the air temperature T2 in the room, the temperature sensor 21 for detecting the air temperature in the working area A is used to measure the air temperature T3 in the working area and the temperature sensor 22 for detecting the temperature of the headstock 13 is used to measure the temperature T4 of the headstock.

In step S5, the average value (arithmetic average value) T5 of the air temperature T3 in the working area and the temperature T4 of the headstock is calculated. In step S5, the weighted average value, the median value or the maximum value of the air temperature T3 in the working area and the temperature T4 of the headstock may also be calculated.

In step S6, whether the average value T5 is higher or lower than both the target temperature T1 in the working area and the air temperature T2 in the room is checked and the routine proceeds to step S8 if the result is YES for driving the cylinder 175 to open the cover 173 and open the opening for working 172. Consequently, the internal air in the working area A is replaced with the external air surrounding the numerically controlled lathe 1 and the temperature in the working area approaches the air temperature T2 in the room. If the result is NO, the cylinder 175 is driven in order to close the cover 173 and close the opening for working 172. Consequently, the replacement of the internal air in the working area A with the external air surrounding the numerically controlled lathe 1 is ended and the operation of the temperature control apparatus is ended.

As a specific example, a case in the spring or autumn is considered where the target temperature T1 in the working area is 20° C.±2° C., the air temperature T2 in the room is 24° C. and the average value T5 of the air temperature T3 in the working area and the temperature T4 of the headstock is 30° C. In this case, T5>T1 and T5>T2, so the cylinder 175 is driven to open the cover 173 and replace the internal air in the working area A with the external air surrounding the numerically controlled lathe 1. When the average value T5 of the air temperature T3 in the working area and the temperature T4 of the headstock become equal to the air temperature T2 in the room, the cylinder 175 is driven to close the cover 173 and close the opening for working 172.

As another specific example, a case in the winter is considered where the target temperature T1 in the working area is 20° C.±2° C., the air temperature T2 in the room is 7° C. and the average value T5 of the air temperature T3 in the working area and the temperature T4 of the headstock is 25° C. In the foregoing case, T5>T1 and T5>T2, so the cylinder 175 is driven to open the cover 173 and replace the internal air in the working area A with the external air surrounding the numerically controlled lathe 1. When the average value T5 of the air temperature T3 in the working area and the temperature T4 of the headstock becomes a temperature between the air temperature T2 in the room and the target temperature T1 in the working area, the cylinder 175 is driven to close the cover 173 and close the opening for working 172. When the business operation begins, the heater is turned on and the air temperature T2 in the room rises to approximately 20° C., the average value T5 of the air temperature T3 in the working area and the temperature T4 of the headstock will become approximately equal to the air temperature T2 in the room.

As another specific example, a case in the winter is considered where the heater is turned on early in the morning, the target temperature T1 in the working area is 20° C.±2° C., the air temperature T2 in the room is 20° C. and the average value T5 of the air temperature T3 in the working area and the temperature T4 of the headstock is 10° C. In the foregoing case, T5<T1 and T5<T2, so the cylinder 175 is driven to open the cover 173 and replace the internal air in the working area A with the external air surrounding the numerically controlled lathe 1. When the average value T5 of the air temperature T3 in the working area and the temperature T4 of the headstock becomes a temperature between the air temperature T2 in the room and the target temperature T1 in the working area, the cylinder 175 is driven to close the cover 173 and close the opening for working 172.

In the foregoing embodiment, since it is possible to eliminate the temperature difference between the temperature in the room in which the working machine is installed and the temperature in the working area as a result of opening the cover and opening the opening for working to replace the internal air in the working area A with the external air surrounding the working machine, an air conditioning unit is no longer required and it is possible to provide an inexpensive and energy-saving temperature control apparatus of a working machine.

In the foregoing embodiment, although the cover 173 as the ventilating means that covers at least a part of the working area A is opened and closed, a fan for discharging the air in the working area A to the outside may also be used.

What is claimed is:

1. A temperature control apparatus of a numerically controlled machine tool including ventilating means for replacing internal air in a working area with external air surrounding the numerically controlled machine tool between the working area inside the numerically controlled machine tool and the exterior of the numerically controlled machine tool, comprising:
   at least one temperature sensor that detects at least one temperature in the working area;
   an external air temperature sensor that detects an external temperature surrounding the numerically controlled machine tool;
   a ventilating means drive unit that drives the ventilating means; and
   a ventilating means control unit that compares one of the at least one temperature in the working area, which is detected with the at least one temperature sensor, the external temperature surrounding the numerically controlled machine tool, which is detected with the external air temperature sensor, and a pre-set target temperature in the working area and, in accordance with the result of the comparison, outputs a signal for driving or stopping the ventilating means to the ventilating means drive unit when the numerically controlled machine tool is not being operated,
   wherein the ventilating means comprises a cover for an opening, which covers at least a part of the working area, and is kept closed during the operation of the numerically controlled machine tool,
   wherein when the numerically controlled machine tool is not being operated, the cover is opened such that air replacement performed by the ventilating means is performed only if the one of the at least one temperature in the working area is (i) higher than both the external temperature surrounding the numerically controlled machine tool and the target temperature in the working area, or (ii) lower than both the external temperature surrounding the numerically controlled machine tool and the target temperature in the working area,
   wherein when the numerically controlled machine tool is being operated, the cover is closed such that air replacement performed by the ventilating means cannot be performed, and
   wherein air replacement performed by the ventilating means is performed by opening and closing the cover for the opening only when the numerically controlled machine tool is not being operated.

2. The temperature control apparatus of a numerically controlled machine tool according to claim 1, wherein one of the at least one temperature in the working area that is detected with the at least one temperature sensor is an air temperature in the working area.

3. The temperature control apparatus of a numerically controlled machine tool according to claim 1, wherein one of the at least one temperature in the working area that is detected with the at least one temperature sensor is a headstock temperature of the numerically controlled machine tool.

4. The temperature control apparatus of a numerically controlled machine tool according to claim 1, wherein the external temperature surrounding the numerically controlled machine tool that is detected with the external air temperature sensor is an air temperature in the room in which the numerically controlled machine tool is installed.

5. The temperature control apparatus of a numerically controlled machine tool according to claim 1, wherein the ventilating means control unit outputs the signal only during a specific time period of a day.

6. A temperature control apparatus of a numerically controlled machine tool including ventilating means for replacing internal air in a working area with external air surrounding the numerically controlled machine tool between the working area inside the numerically controlled machine tool and the exterior of the numerically controlled machine tool, comprising:
   at least one temperature sensor that detects at least one temperature in the working area;
   an external air temperature sensor that detects an external temperature surrounding the numerically controlled machine tool;
   a ventilating means drive unit that drives the ventilating means; and
   a ventilating means control unit that compares one of the at least one temperature in the working area, which is detected with the at least one temperature sensor, the external temperature surrounding the numerically controlled machine tool, which is detected with the external air temperature sensor, and a pre-set target temperature in the working area and, in accordance with the result of the comparison, outputs a signal for driving or stopping the ventilating means to the ventilating means drive unit when the numerically controlled machine tool is not being operated,
   wherein the ventilating means comprises a cover for an opening, which covers at least a part of the working area, and is kept closed during the operation of the numerically controlled machine tool,
   wherein when the numerically controlled machine tool is not being operated, the cover is opened such that air replacement performed by the ventilating means is performed only if the one of the at least one temperature in the working area is (i) higher than both the external temperature surrounding the numerically controlled machine tool and the target temperature in the working area, or (ii) lower than both the external temperature surrounding the numerically controlled machine tool and the target temperature in the working area, wherein when the numerically controlled machine tool is being operated, the cover is closed such that air replacement performed by the ventilating means cannot be performed, and wherein one of the at least one temperature in the working area that is detected with the at least one temperature sensor is a headstock temperature of the numerically controlled machine tool.

7. The temperature control apparatus of a numerically controlled machine tool according to claim 6, wherein another of the at least one temperature in the working area that is detected with another of the at least one temperature sensor is an air temperature in the working area.

8. The temperature control apparatus of a numerically controlled machine tool according to claim 6, wherein the external temperature surrounding the numerically controlled machine tool that is detected with the external air temperature sensor is an air temperature in the room in which the numerically controlled machine tool is installed.

9. The temperature control apparatus of a numerically controlled machine tool according to claim 6, wherein the ventilating means control unit outputs the signal only during a specific time period of a day.

* * * * *